(12) United States Patent
Kamp et al.

(10) Patent No.: US 11,706,863 B2
(45) Date of Patent: Jul. 18, 2023

(54) TRANSMITTING AN ALTERNATIVE LIGHT COMMAND FOR A LONGER PERIOD

(71) Applicant: SIGNIFY HOLDING B.V., Eindhoven (NL)

(72) Inventors: Antonie Leonardus Johannes Kamp, San Francisco, CA (US); Aloys Hubbers, Eindhoven (NL); Daniel Martin Goergen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 325 days.

(21) Appl. No.: 17/269,076

(22) PCT Filed: Jul. 30, 2019

(86) PCT No.: PCT/EP2019/070537
§ 371 (c)(1),
(2) Date: Feb. 17, 2021

(87) PCT Pub. No.: WO2020/035310
PCT Pub. Date: Feb. 20, 2020

(65) Prior Publication Data
US 2021/0176847 A1    Jun. 10, 2021

(30) Foreign Application Priority Data

Aug. 17, 2018 (EP) .................................. 18189429

(51) Int. Cl.
*H05B 47/175* (2020.01)
*H05B 47/16* (2020.01)
*H05B 47/155* (2020.01)

(52) U.S. Cl.
CPC ......... *H05B 47/175* (2020.01); *H05B 47/155* (2020.01); *H05B 47/16* (2020.01)

(58) Field of Classification Search
CPC .... H05B 47/175; H05B 47/155; H05B 47/16; H05B 47/19; Y02B 20/40
See application file for complete search history.

(56) References Cited

U.S. PATENT DOCUMENTS

2018/0295699 A1* 10/2018 Franciosa ............... H05B 47/19
2018/0317305 A1* 11/2018 Krajnc ..................... G08B 5/00
2019/0230769 A1* 7/2019 Magielse ............... H05B 47/12

FOREIGN PATENT DOCUMENTS

WO    2012093342 A1    7/2012
WO    2015185704 A1    12/2015
(Continued)

*Primary Examiner* — Minh D A

(57) ABSTRACT

An electronic device is configured to determine apart (161) of a light effect for a first period and determine a succeeding part (186) of the light effect for a second period succeeding the first period. The electronic device is further configured to determine a likelihood that a second original light command specifying a part (162) of a light effect for the second period will not arrive at its destination and transmit an original first light command or determine and transmit an alternative first light command in dependence on the likelihood and/or the determined succeeding part of the light effect. The original first light command specifies the part of the light effect and the alternative first light command is determined based on the part and the succeeding part of the light effect and specifies a portion of the light effect for both the first period and the second period.

15 Claims, 5 Drawing Sheets

(56) References Cited

FOREIGN PATENT DOCUMENTS

| | | | |
|---|---|---|---|
| WO | 2016015998 | A1 | 2/2016 |
| WO | 2016055648 | A1 | 4/2016 |
| WO | 2016166034 | A1 | 10/2016 |

\* cited by examiner

TRANSMITTING AN ALTERNATIVE LIGHT COMMAND FOR A LONGER PERIOD

CROSS-REFERENCE TO PRIOR APPLICATIONS

This application is the U.S. National Phase application under 35 U.S.C. § 371 of International Application No. PCT/EP2019/070537, filed on Jul. 30, 2019, which claims the benefit of European Patent Application No. 18189429.6, filed on Aug. 17, 2018. These applications are hereby incorporated by reference herein.

FIELD OF THE INVENTION

The invention relates to an electronic device for transmitting a light command.

The invention further relates to a method of transmitting a light command.

The invention also relates to a computer program product enabling a computer system to perform such a method.

BACKGROUND OF THE INVENTION

Philips Hue is a consumer connected lighting solution. With 'Hue Entertainment' the Philips Hue lighting system provides a way to play fast, synchronous light effects, by streaming light commands over a low bandwidth wireless Zigbee network. This is, for example, used to synchronize lights in a home environment with immersive content like video games, video and music. Light effects are divided into multiple parts and for each part a light command is transmitted in a Zigbee message. A light command typically has a pre-agreed duration, e.g. 40 milliseconds, and may also be referred to in this context as a light frame.

The reason to support this 'entertainment' use case over a network technology like ZigBee, is to enable it on a huge existing install base of existing smart home lighting products. However, ZigBee was originally designed for a very different low bandwidth home automation use case and the chance of not all light commands arriving at a light device is relatively high. The same applies to other network technologies. Light commands may be lost between a wireless transmitter and a wireless receiver, i.e. not arrive at the wireless transmitter or arrive corrupted at the wireless receiver, but certain light commands may also be dropped if the bandwidth is limited and other control information needs to be transmitted, as disclosed in WO 2016/015998. In both cases, the light effects specified in these lights commands will normally not be rendered smoothly.

SUMMARY OF THE INVENTION

It is a first object of the invention to provide an electronic device, which is able to cause smooth light effects to be rendered even when light commands are transmitted over a somewhat unreliable network with limited bandwidth.

It is a second object of the invention to provide a method of determining a light script, which is able to cause smooth light effects to be rendered even when light commands are transmitted over a somewhat unreliable network with limited bandwidth.

In a first aspect of the invention, the electronic device comprises at least one processor configured to determine a first part of a light effect for a first period, determine a second part of said light effect for a second period succeeding said first period, determine a likelihood that a second original light command specifying the second part of a light effect for said second period will not arrive at a destination of said second original light command, and transmit an original first light command or determine and transmit an alternative first light command in dependence on said likelihood and/or said determined succeeding part of said light effect, said original first light command specifying said first part of said light effect for said first period and said alternative first light command being determined based on said first part and said second part of said light effect and specifying a portion of said light effect for both said first period and said second period.

The inventors have recognized that there is usually not sufficient time and network bandwidth to retransmit lost light commands, because light commands are synchronized to other content and thus time sensitive. The inventors have therefore devised a solution in which an alternative light command, which specifies a part of a light effect that is longer than the original light command, may be transmitted instead of the original light command. This allows the electronic device to cause light effects that are smooth to be rendered, even if the network over which the light commands are transmitted is somewhat unreliable and/or has limited bandwidth.

Said at least one processor maybe configured to determine said second part of said light effect by predicting said second part from said first part of said light effect. In some cases, e.g. when a light script is available and the electronic device is in possession of this light script or the relevant part(s) thereof, the second part of the light effect does not need to be predicted. However, in many cases, a light script is not available, e.g. when light commands are determined based on content (analysis) in real-time.

Said at least one processor may be configured to predict said second part of said light effect by determining (a part of) a trajectory of said light effect based on extrapolating said first part of said light effect. This gives good results for several types of light effects.

Said at least one processor may be configured to perform said extrapolation further based on historical trajectories of rendered light effects. As light effects usually follow one of a limited set of trajectories, this helps predict the trajectory of the (current) light effect.

Said at least one processor may be configured to select said historical trajectories by selecting historical trajectories with a similar part as said trajectory from a collection of historical trajectories. This helps select the historical trajectory that is likely used for the (current) light effect.

Said at least one processor may be configured to select said historical trajectories from a collection of historical trajectories based on an application type of an application which created said light effect. This helps select the historical trajectory that is likely used for the (current) light effect.

Said at least one processor may be configured to determine which shape best matches (said parts of) said trajectory and transmit said original first light command or determine and transmit said alternative first light command in dependence on said determined shape. By matching the shape, it may be possible to determine the predictability of the trajectory of the second part. If this trajectory cannot be predicted accurately, transmitting an alternative first light command may not be beneficial. Said at least one processor may be configured to transmit said alternative first light command if said shape is determined to be linear. Said at least one processor may be configured to transmit said original first command if said shape is determined to be irregular.

Said at least one processor may be configured to include in said alternative first light command an indication of the duration of said portion of said light effect. In certain cases, it may be possible to include the duration itself in a light command. However, this takes up more space, which is sometimes not available. By using a fixed, pre-agreed minimum duration for light commands and indicating whether this minimum duration needs to be doubled (or tripled or quadrupled), a single bit (or a few bits) may be sufficient to specify the duration of the current portion of the light effect.

Said at least one processor may be configured to determine a likelihood that a third original light command specifying a third part of light effect for a third period succeeding said second period will not arrive at said destination and determine said second part of said light effect for both said second period and said third period, said alternative first light command specifying a portion for said light effect for said first period, said second period and said third period. This is beneficial if the chance of a light command not arriving at its destination is high enough that multiple successive light commands might not arrive at its destination.

Said at least one processor may be configured to determine said likelihood that said second original light command will not arrive at said destination of said second original light command based on feedback from one or more light devices, knowledge possessed by a network scheduler and/or statistics received from a MAC layer through which said second original light command will be transmitted.

In a second aspect of the invention, the method comprises determining a part of a light effect for a first period, determining a second part of said light effect for a second period succeeding said first period, determining a likelihood that a second original light command specifying the second part of said light effect for said second period will not arrive at a destination of said second original light command, and transmitting an original first light command or determining and transmitting an alternative first light command in dependence on said likelihood and/or said determined succeeding part of said light effect, said original first light command specifying said part of said light effect for said first period and said alternative first light command being determined based on said first part and said second part of said light effect and specifying a portion of said light effect for both said first period and said second period. Said method may be performed by software running on a programmable device. This software may be provided as a computer program product.

In a third aspect of the invention, the electronic device comprises at least one processor configured to receive a first light command specifying a part of a light effect for a first period, predict a second part of said light effect for a second period succeeding said first period from said part of said light effect, and render said second part of said light effect on one or more light sources upon determining that a second light command specifying a light effect for said second period was not received within a certain amount of time.

In a fourth aspect of the invention, the method comprises receiving a first light command specifying a part of a light effect for a first period, predicting a second part of said light effect for a second period succeeding said first period from said part of said light effect, and rendering said second part of said light effect on one or more light sources upon determining that a second light command specifying a light effect for said second period was not received within a certain amount of time. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: determining a first part of a light effect for a first period, determining a second part of said light effect for a second period succeeding said first period, determining a likelihood that a second original light command specifying said second part of said light effect for said second period will not arrive at a destination of said second original light command, and transmitting an original first light command or determining and transmitting an alternative first light command in dependence on said likelihood and/or said determined second part of said light effect, said original first light command specifying said first part of said light effect for said first period and said alternative first light command being determined based on said first part and said second part of said light effect and specifying a portion of said light effect for both said first period and said second period.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
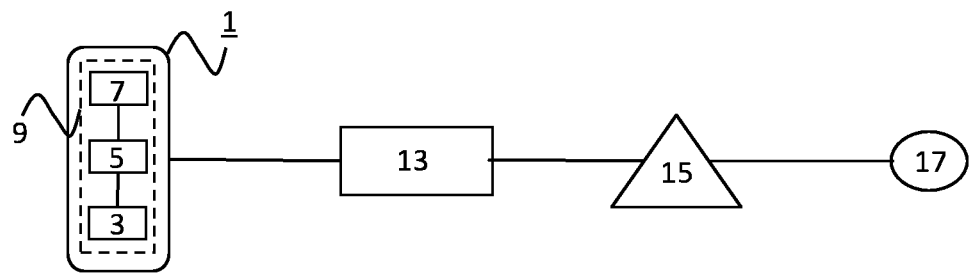
FIG. 1 shows a first embodiment of the first electronic device of the invention.

FIG. 1 shows a first embodiment of the electronic device of the invention: a mobile device 1. The mobile device is connected to a wireless LAN access point 13. A bridge 15, e.g. a Philips Hue bridge, is also connected to the wireless LAN access point 13, e.g. via Ethernet. The bridge 15 communicates with the light device 17, e.g. using Zigbee technology. The light device 17 may be a Philips Hue light, for example.

The mobile device 1 is running an application which generates light effects. Different types of applications which generate lights effect may be distinguished. From a technology requirement standpoint, one important difference between types of applications is whether (a) the light effects must be generated based on the content in real time, or (b) the light effects are already known beforehand and only need to be synchronized with the content. Some examples:

(a) When playing a light show in sync with a known song, it could be that the full light script for that song is already pre-generated.

(b) An application which continuously captures the colors on a screen, and translates those on the fly to light effects.

(a+b) A video game where certain individual effects are pre-scripted, but those effects must instantly react to the (unpredictable) players' interaction in the game.

In the embodiment of FIG. 1, the mobile device 1 is capable of running all these types of applications. The mobile device 1 comprises a transceiver 3, a processor 5, memory 7 and a display 9. The processor 5 is configured to determine a (first) part of a light effect for a first period, determine a second (or, in alternative wording, succeeding) part of the light effect for a second period succeeding the first period, and determine a likelihood that a second original light command specifying a part of a light effect for the second period will not arrive at a destination of the second original light command.

The processor 5 is further configured to transmit (using the transceiver 3) an original first light command or determine and transmit (using the transceiver 3) an alternative first light command in dependence on the likelihood and/or the determined succeeding part of the light effect. The original first light command specifies the part of the light effect for the first period and the alternative first light command is determined based on the part and the succeeding part of the light effect and specifies a portion of the light effect for both the first period and the second period. A light command may specify a target value (e.g. a chromaticity and/or brightness setting) at which a transition should end after the period to which the light command pertains expires, for example.

If the application is of type a), then the mobile device 1 does not need to predict the succeeding part, because it can determine the succeeding part from the light script. If the application is of type b) or a+b), then the mobile device 1 predicts the succeeding part.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. In the embodiment shown in FIG. 1, a receiver and a transmitter have been combined into a transceiver 3. In an alternative embodiment, one or more separate receiver components and one or more separate transmitter components are used. In an alternative embodiment, multiple transceivers are used instead of a single transceiver.

The transceiver 3 may use one or more wireless communication technologies to communicate with the bridge 13, e.g. Wi-Fi. The display 9 may comprise an LCD or OLED display panel, for example. The display 9 may be a touch screen, for example. The processor 5 may use this touch screen to provide a user interface, for example. The mobile device 1 may comprise other components typical for a mobile device such as a battery and a power connector. The memory 7 may comprise one or more memory units. The memory 7 may comprise solid state memory, for example. The invention may be implemented using a computer program running on one or more processors.

Figure 2:
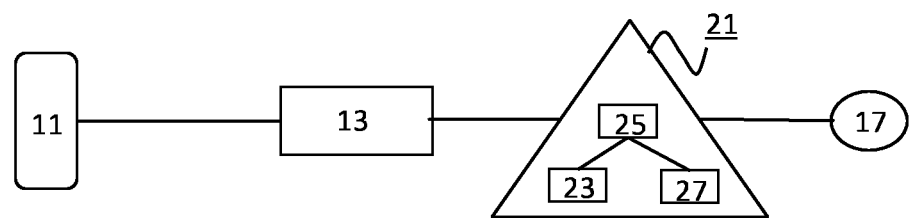
FIG. 2 shows a second embodiment of the first electronic device of the invention.

FIG. 2 shows a second embodiment of the electronic device of the invention: a bridge 21, e.g. a Philips Hue bridge. This embodiment may be beneficial if the invention is not implemented in all applications/devices that can generate light effects. In the example of FIG. 2, a mobile phone 11 is capable of running applications of types (a), (b) and (a+b), but does not implement the invention. The bridge 21 comprises a transceiver 23, a processor 25, and a memory 27. The processor 25 is configured to determine a part of a light effect for a first period, determine a succeeding part of the light effect for a second period succeeding the first period, and determine a likelihood that a second original light command specifying a part of a light effect for the second period will not arrive at a destination of the second original light command.

The processor 25 is further configured to transmit (using the transceiver 23) an original first light command or determine and transmit (using the transceiver 23) an alternative first light command in dependence on the likelihood and/or the determined succeeding part of the light effect. The original first light command specifies the part of the light effect for the first period and the alternative first light command is determined based on the part and the succeeding part of the light effect and specifies a portion of the light effect for both the first period and the second period.

In the embodiment of FIG. 2, the bridge 21 receives the original first light command from the mobile device 11 and determines the part of the light effect for the first period from the received original first light command. If the application is of type a), then the bridge 21 may receive a light script or relevant parts of the light script from the mobile device 11. In this case, the bridge 21 does not need to predict the succeeding part, because it can determine the succeeding part from the light script (parts). If the application is of type b) or a+b), then the bridge 21 predicts the succeeding part.

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The transceiver 23 may use one or more communication technologies to communicate with the wireless LAN access point 13, e.g. Ethernet. In an alternative embodiment, multiple transceivers are used instead of a single transceiver. In the embodiment shown in FIG. 2, a receiver and a transmitter have been combined into a transceiver 23. In an alternative embodiment, one or more separate receiver components and one or more separate transmitter components are used. The bridge 21 may comprise other components typical for a network device such as a power connector. The invention may be implemented using a computer program running on one or more processors.

Figure 3:
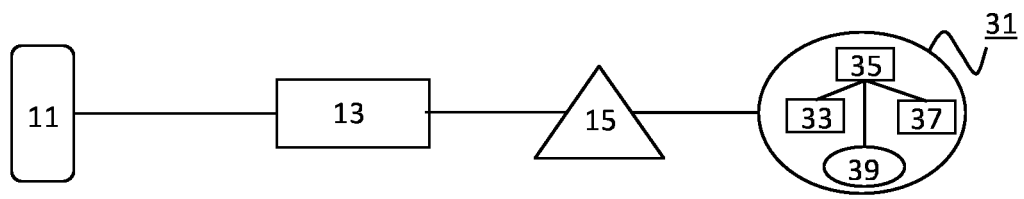
FIG. 3 shows an embodiment of the second electronic device of the invention.

FIG. 3 shows a third embodiment of the electronic device of the invention: a lighting device 31, e.g. a Philips Hue light. The light 31 comprises a transceiver 33, a processor 35, a memory 27, and a light source 39. The processor 35 is configured to receive a first light command specifying a part of a light effect for a first period, predict a succeeding part of the light effect for a second period succeeding the first period from the part of the light effect, and render the succeeding part of the light effect on the light source 39 upon determining that a second light command specifying a light effect for the second period was not received within a certain amount of time. This embodiment has the advantage that prediction is only necessary if an original light command is really lost, but requires more complex hardware and software in the light devices.

In the embodiment of the lighting device 31 shown in FIG. 3, the lighting device 31 comprises one processor 35. In an alternative embodiment, the lighting device 31 comprises multiple processors. The processor 35 of the lighting device 31 may be a general-purpose processor or an application-specific processor. The processor 35 of the lighting device 31 may run a Unix-based operating system for example. The light source 39 may comprise one or more LED diodes, for example. The memory 37 may comprise one or more memory units. The memory 37 may comprise one or more hard disks and/or solid-state memory, for example.

In the embodiment shown in FIG. 3, a receiver and a transmitter have been combined into a transceiver 33. In an alternative embodiment, one or more separate receiver components and one or more separate transmitter components are used. In an alternative embodiment, multiple transceivers are used instead of a single transceiver. The transceiver 33 may use one or more wireless communication technologies to communicate with bridge 15, e.g. ZigBee. The lighting device 31 may comprise other components typical for a lighting device such as a power connector.

Figure 4:
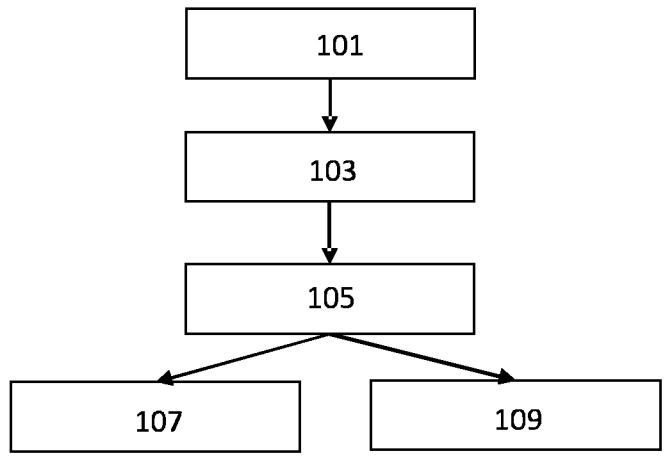
FIG. 4 is a flow diagram of a first embodiment of the first method of the invention.

A first embodiment of the method of the invention is shown in FIG. 4. A step 101 comprises determining a part of a light effect for a first period. A step 103 comprises determining a succeeding part of the light effect for a second period succeeding the first period. A step 105 comprises determining a likelihood that a second original light command specifying a part of a light effect for the second period will not arrive at a destination of the second original light command.

In the embodiment of FIG. 4, a decision is made after step 105 whether to perform step 107 or step 109. Step 107 comprises transmitting an original first light command. Step 109 comprises determining and transmitting an alternative first light command. The original first light command specifies the part of the light effect for the first period. The alternative first light command is determined based on the part and the succeeding part of the light effect and specifies a portion of the light effect for both the first period and the second period. The decision whether to perform step 107 or step 109 depends on the likelihood and/or the determined succeeding part of the light effect.

For example, normally a device sends out a light value with a transition time that is equal to a pre-agreed period (which is the transition time of the original first light command if the device received an original first light command). If the device estimates the likelihood of losing a light command to be relatively high (or even 'certain' e.g. when another network message must be prioritized), and it predicts the current effect to continue relatively linearly, it will send a predicted future value with a longer transition time. If the next light command indeed gets lost, the light will continue its longer transition instead of stalling, which results in a smoother effect. If the next light command happens to not get lost, then the longer transition (which would not have deviated far off from the actual transition) will be cancelled, and the most recent light command will be used.

In the embodiment of FIG. 4, the alternative first light command is only determined if step 107 is not performed. In an alternative embodiment, step 109 does not comprises determining the alternative first light command, but the alternative first light command is determined before the decision whether to perform step 107 or step 109 is made.

Figure 5:
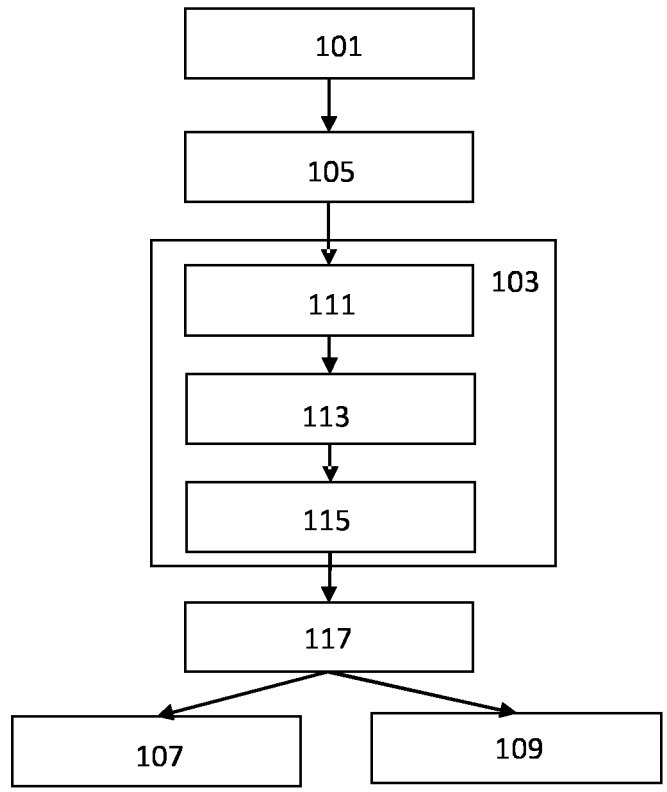
FIG. 5 is a flow diagram of a second embodiment of the first method of the invention.

A second embodiment of the method of the invention is shown in FIG. 5. In the embodiment of FIG. 5, steps 103 and 105 are performed in reverse order compared to FIG. 4. In an alternative embodiment, steps 103 and 105 are performed in parallel. Step 101 comprises determining a part of a light effect for a first period, e.g. from a received original first light command. In the embodiment of FIG. 5, a light command specifies a target value at which the transition should end. The light device can use interpolation to determine a transition from the current value to the target value. In the embodiment of FIG. 5, the light device only uses linear interpolation. The transition has a certain transition time, which may be a pre-agreed transition time or which may be specified in the light command.

Next, step 105 comprises determining the likelihood that the second original light command will not arrive at its destination. There are multiple ways of doing this and a combination of these methods may be used:

Fixed. In a relatively basic implementation, a fixed network reliability is assumed based on an average reliability from previous transmissions (e.g. test transmissions), preferably in different environments.

Based on feedback from the light devices. The light devices in the network (the destinations of the light commands) can determine how many light commands are getting lost over a period. When this average number changes significantly, they can send a notification to a device transmitting light commands. Based on this information, this device can better estimate the current reliability of the network. This can detect situations like ongoing interference because there is some large file downloading going on the same frequency band, or a case where the stream needs to pass through a relatively weak link in the ZigBee mesh network.

Based on knowledge from a network scheduler. Typically, multiples types of messages are transmitted over a Zigbee mesh network. A network scheduler manages one or more queues and selects messages to be transmitted from the queue(s). This scheduler will know that a next light command of a stream must be dropped because of other traffic (stream, regular light control, software update, polling, MTO routing etc). With this knowledge, it can be determined with certainty that a certain light command will get dropped.

Based on statistics from the MAC layer. The MAC layer may be able to provide statistics with regard to its transmissions, such as failed media access and noise level.

Next, step 103 comprises predicting the most likely path of the light effect through chromaticity/brightness space. There are multiple ways of doing this and a combination of these methods may be used:

1) Simply taking the trajectory of the most recent transition(s), e.g. as specified in the most recent light command(s), and linearly, polynomially or otherwise extrapolating it. Extrapolation is preferably done in the CIELAB or CIELUV color space, as these color spaces separate lightness from chromaticity and are (almost) perceptually uniform. Unless there is knowledge (explicit, or inferred from historical trajectory) that the application itself uses another color space to render transitions, then the same color space as the application is preferred to get the best alignment.

2) Storing certain historical trajectories (e.g. for the current streaming session) and trying to recognize that the current effect starts very much like an effect which already happened before, therefore assuming it will continue in a similar way as the matching historical trajectory.

3) In certain application types, e.g. (a) or (a+b), the (likely) trajectory of the current effect or even the whole light script is already known beforehand, so this data can be used.

In 1) and 2), the succeeding part of the light effect is predicted from the (known) part of the light effect. In 1) and 2), the succeeding part of the light effect is predicted by determining a part of a trajectory of the light effect based on the part of the light effect and extrapolating a succeeding part of the trajectory from the part of the trajectory. In 2), the extrapolation is further based on historical trajectories of rendered light effects. These historical trajectories may be selected from a collection of historical trajectories based on an application type of an application which created the light effect.

Step 117 comprises deciding whether the original first light commands needs to be adjusted based on the outcome of steps 103 and 105 and if so, how. In situations with a higher likelihood of light command loss, the content of the light command may be adjusted to compensate for potential losses of other light commands. A very often occurring light effect is a smooth (almost) linear transition through brightness and/or chromaticity space. Moreover, if all lights are performing such a smooth transition at the same time, then this is also the type of effect where hiccups are especially noticeable to the user, and thus most degrading to the experience. This observation leads to a straightforward but effective way to adjust certain light effects to make them more resilient for potential light command drops/losses:

If a transition is predicted to be linear, the light command is adjusted so that it specifies the future predicted value as target value, along with the indication to use a longer transition time If a transition is predicted to be very non-linear or very sharply changing direction, i.e. irregular, the original light command is transmitted.

If the transition is predicted to be somewhere in between, then the decision to adjust the light command or transmit the original light command is made based on how close to linear it is (from step 103) and how likely it is that the next light command(s) gets lost (from step 105).

A trajectory may be compared with one or more known shapes (e.g. linear in this embodiment and linear, sine and block in another embodiment) in order to predict whether the transition is linear or irregular. Several points of the trajectory may be compared with corresponding points of the one or more known shape in order to determine a similarity measure.

Figure 7:
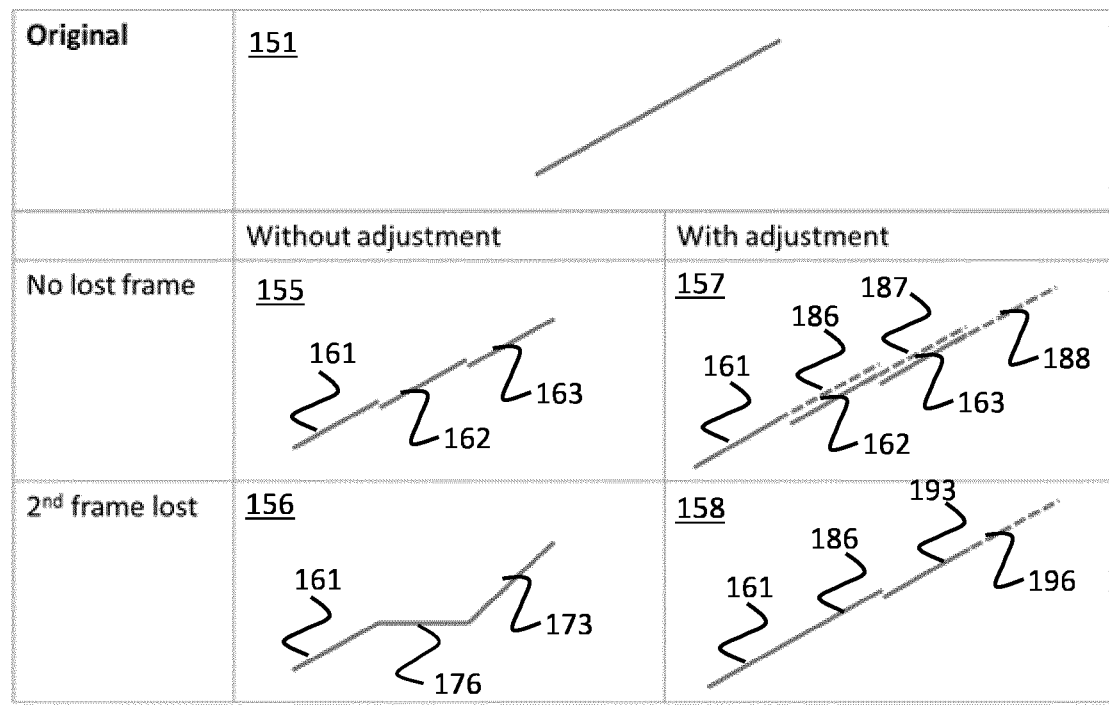
FIG. 7 depicts a first example of the use of an alternative first light command.
Figure 8:
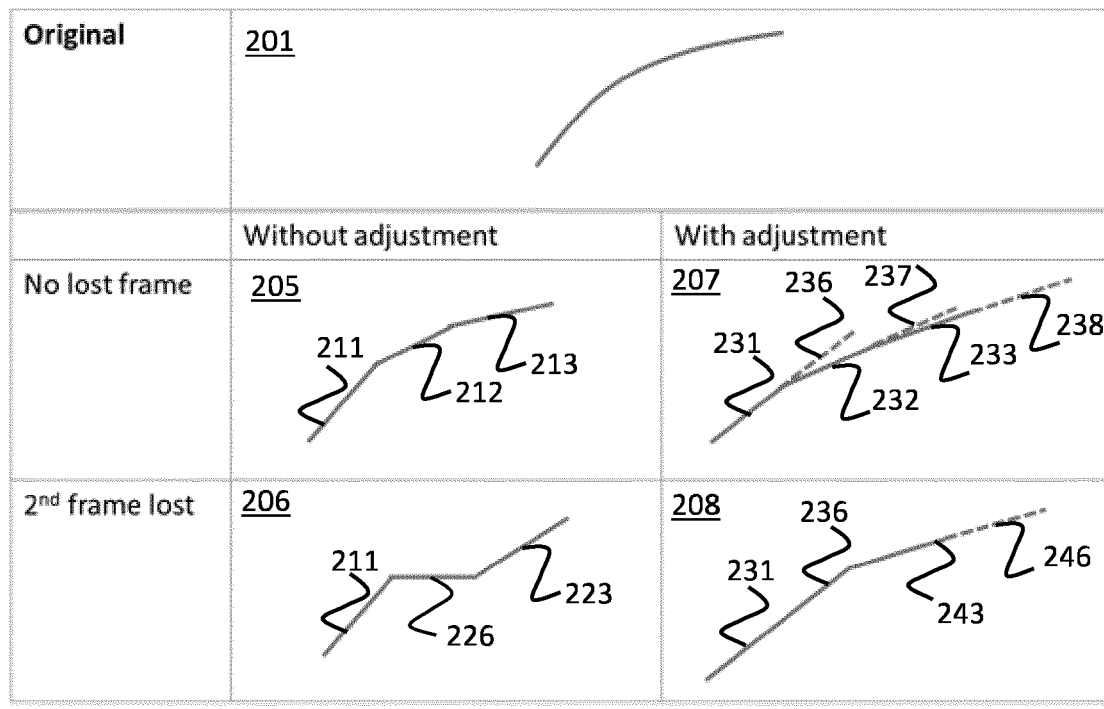
FIG. 8 depicts a second example of the use of an alternative first light command.
Figure 9:
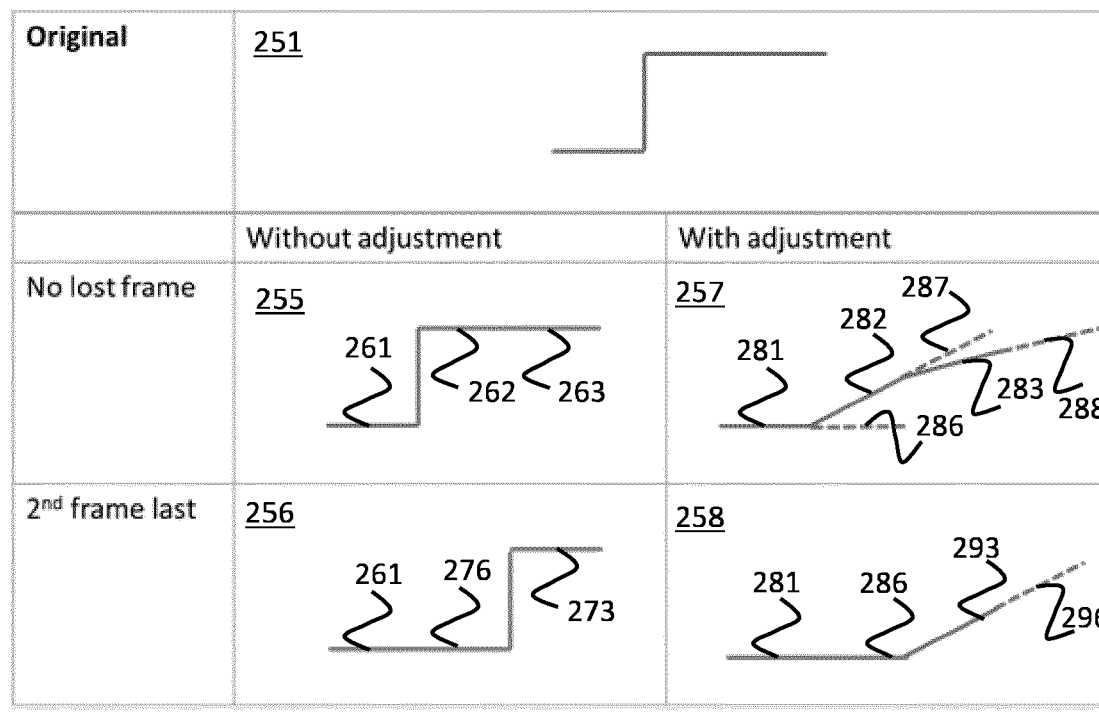
FIG. 9 depicts a third example of the use of an alternative first light command.

Examples of these adjustments are shown in FIGS. 7 to 9. In FIG. 7, an original effect 151 is depicted which follows a linear path. If such an effect is predicted, it is very effective to adjust the light command in such a way that the value for the predicted light command ahead is already sent with a longer transition time. As can be seen, when there is no lost light command, the final effect will look equally the same with (effect 157) or without (effect 155) this adjustment. However, if a light command is lost, the case without adjustment will result in a very jittery/non-smooth effect 156. In case of adjustment, the effect 158 will look exactly as the originally predicted path 151. So, in this case the adjusted light commands are transmitted, independent of the network reliability.

The light effect 155 without adjustment and without lost light command comprises a received part 161, a received part 162 and a received part 163. The light effect 157 with adjustment and without lost light command comprises a received part 161, a received part 162 and a received part 163 and further comprises unused predicted parts 186-187 and yet unused predicted part 188. The light effect 156 without adjustment in which the second light command (second frame) is lost comprises a received part 161, a used predicted part 176 and a received part 173. The light effect 158 with adjustment in which the second light command is lost comprises a received part 161, a used predicted part 186, a received part 193 and a yet unused predicted part 196.

In FIG. 8, an original effect 201 is depicted which follows a more quadratic path. If such an effect is predicted and there is no lost light command, the effect without adjustment 205 will look a bit more like the original light effect 201 than the one with adjustment 207. However, should a light command get lost then the adjusted version 208 will look much better/smoother than the one without adjustment 206. So, in this case, the decision whether to use the original or the adjusted light command depends on the outcome of step 105 (i.e. on the risk of the light command not arriving at its destination).

The light effect 205 without adjustment and without lost light command comprises a received part 211, a received part 212 and a received part 213. The light effect 207 with adjustment and without lost light command comprises a received part 231, a received part 232 and a received part 233 and further comprises unused predicted parts 236-237 and yet unused predicted part 238. The light effect 206 without adjustment in which the second light command (second frame) is lost comprises a received part 211, a used predicted part 226 and a received part 223. The light effect 208 with adjustment in which the second light command is lost comprises a received part 231, a used predicted part 236, a received part 243 and a yet unused predicted part 246. Although parts/transitions 213 and 223 correspond to the same light command and the transitions end at the same point, the transitions start at different points.

In FIG. 9, an original effect 251 is depicted which follows a path which sharply changes in direction. Here, adjusting the effect always gives a strong distortion, independent on whether a light command is lost: in both cases the flashy effect would be changed into a sluggish effect, see versions with adjustments 257 (no lost light command) and 258 ($2^{nd}$ light command lost). In contrast, streaming the content without adjustment gives much less noticeable difference, see versions without adjustment 255 (no lost light command) and 256 ($2^{nd}$ light command lost). So, in this case, the choice would be to transmit the light command as is, independent of the network reliability.

The light effect 255 without adjustment and without lost light command comprises a received part 261, a received part 262 and a received part 263. The light effect 257 with adjustment and without lost light command comprises a received part 281, a received part 282 and a received part 283 and further comprises unused predicted parts 286-287 and yet unused predicted part 288. The light effect 256 without adjustment in which the second light command is lost comprises a received part 261, a used predicted part 276 and a received part 273. The light effect 258 with adjustment in which the second light command is lost comprises a received part 281, a used predicted part 286, a received part 293 and a yet unused predicted part 296.

Step 107 is performed to transmit the original light command (i.e. without adjustment). Step 109 is performed to transmit the adjusted light command. The alternative light command may comprise an indication of the duration of the portion of the light effect, e.g. "0" for the normal transition time and "1" for double the transition time. If the next light command is dropped and the adjusted version was transmitted, a hiccup was prevented and the experience was thereby improved. If the adjusted version was transmitted and the next light command is not dropped, then the ongoing transition is just cancelled, and the trajectory of the latest light command is used.

Figure 6:
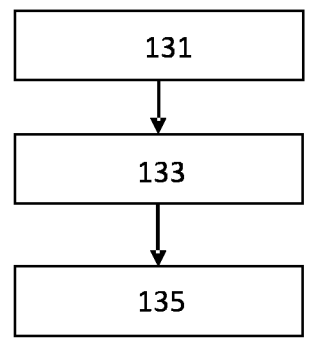
FIG. 6 is a flow diagram of an embodiment of the second method of the invention.

A third embodiment of the method of the invention is shown in FIG. 6. A step 131 comprises receiving a first light command specifying a part of a light effect for a first period. A step 133 comprises predicting a succeeding part of the light effect for a second period succeeding the first period from the part of the light effect. A step 135 comprises rendering the succeeding part of the light effect on one or more light sources upon determining that a second light command specifying a light effect for the second period was not received within a certain amount of time.

In the embodiment of FIG. 5, the alternative light command could only specify a transition for double the normal transition time. In an alternative embodiment, a likelihood that a third original light command specifying a light effect for a third period succeeding the second period will not arrive at the destination is determined and the succeeding part of the light effect for both the second period and the third period is determined. In this case, the alternative first light command specifies a portion for the light effect for the first period, the second period and the third period. Thus, in this case, the alternative light command could also specify a transition for triple the normal transition time. In a different embodiment, the alternative light command could even specify longer transition times. However, longer predictions may not be as good as shorter predictions.

By indicating the transition time per light command instead of per light device, the size of a light command for multiple light devices hardly needs to be increased. This works well in practice because hiccups are only noticeable when all light devices are performing a smooth transition. If certain lights are flashing, then there is not much use for smoothening out other lights, because small hiccups are outweighed by large flashes. However, it would also be possible to specify different transitions and transition times for different light devices at the expense of increasing the message size.

In the embodiment of FIG. 5, the light device only uses linear interpolation. Instead of supporting only linear interpolation, other types of interpolation could be supported as well. For example, if another type of trajectory (sine, block) would occur/be predicted very often, this could be indicated in the light command and supported in the light device. This would require only slightly more data to be transported if done per message (typically, only a handful of paths like linear, left/right curvatures cubic, exponential would need to be supported). This would however result in more complex implementation in the light device.

Figure 10:
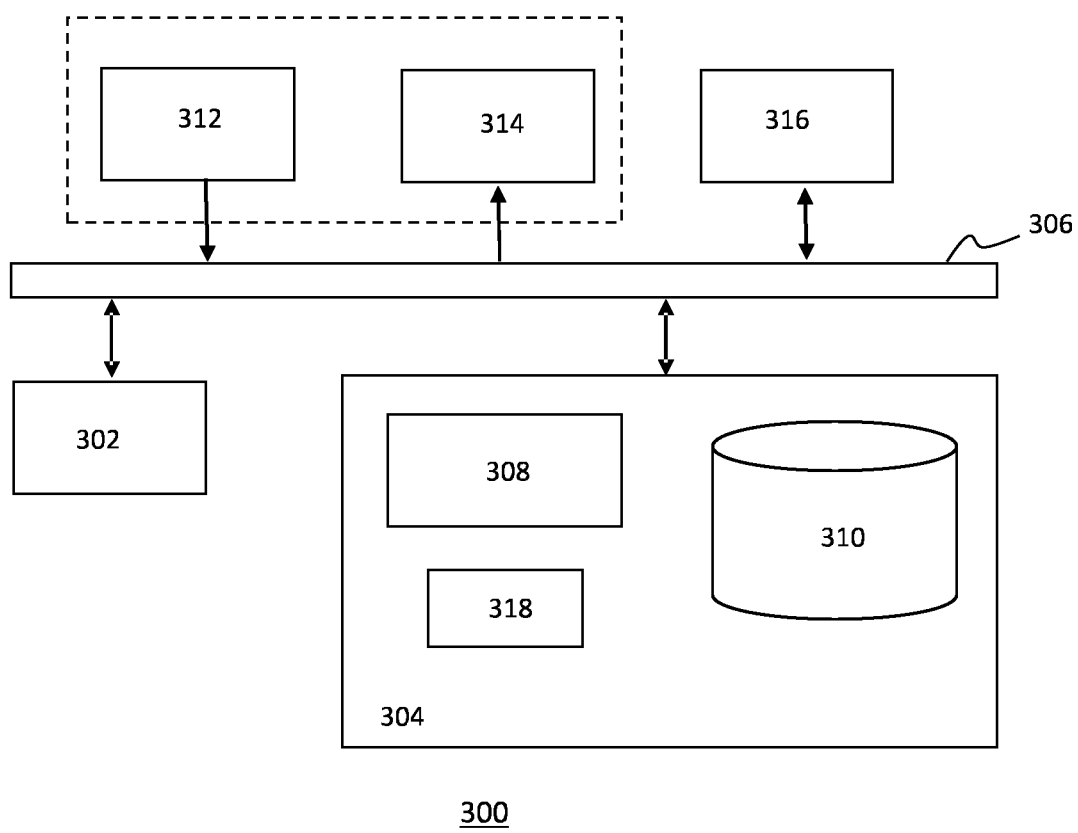
FIG. 10 is a block diagram of an exemplary data processing system for performing the method of the invention.

FIG. 10 depicts a block diagram illustrating an exemplary data processing system that may perform the method as described with reference to FIGS. 4 to 6.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device for causing one or more lighting devices to render a light effect, the electronic device comprising at least one processor configured to:
   determine a first part of said light effect to be rendered by said one or more lighting devices during a first period based on an original first light command,
   determine a likelihood that an original second light command specifying a second part of said light effect to be rendered by said one or more lighting devices during a second period, succeeding said first period, will not arrive at a destination of said original second light command is above a threshold,
   determine said second part of said light effect, and
   determine and transmit an alternative first light command, instead of the original first light command, in dependence on said determined likelihood and based on said determined second part of said light effect, said alternative first light command being determined based on said determined first part of said light effect and said determined second part of said light effect and said alternative first light command specifying a portion of said light effect for both said first period and said second period.

2. An electronic device as claimed in claim 1, wherein said at least one processor is configured to determine said second part of said light effect by predicting said second part from said first part of said light effect.

3. An electronic device as claimed in claim 2, wherein said at least one processor is configured to predict said second part of said light effect by determining a trajectory of said light effect based on extrapolating said first part of said light effect.

4. An electronic device as claimed in claim 3, wherein said at least one processor is configured to perform said extrapolation further based on historical trajectories of rendered light effects.

5. An electronic device as claimed in claim 4, wherein said at least one processor is configured to select said historical trajectories by selecting historical trajectories with a similar part as said trajectory from a collection of historical trajectories.

6. An electronic device as claimed in claim 4, wherein said at least one processor is configured to select said historical trajectories from a collection of historical trajectories based on an application type of an application which created said light effect.

7. An electronic device as claimed in claim 3, wherein said at least one processor is configured to determine which shape best matches said trajectory and transmit said alternative first light command in dependence on said determined shape.

8. An electronic device as claimed in claim 7, wherein said shape is determined to be linear.

9. An electronic device as claimed in claim 7, wherein said shape is determined to be irregular.

10. An electronic device as claimed in claim 1, wherein said at least one processor is configured to include in said alternative first light command an indication of the duration of said portion of said light effect.

11. An electronic device as claimed in claim 1, wherein said at least one processor is configured to determine a likelihood that a original third light command specifying a third part of said light effect to be rendered by said one or more lighting devices during a third period, succeeding said second period, will not arrive at said destination and determine said second part of said light effect for both said second period and said third period, said alternative first light command specifying a portion for said light effect for said first period, said second period and said third period.

12. An electronic device as claimed in claim 1, wherein said at least one processor is configured to receive said original first light command from another device and determine said first part of said light effect from said original first light command.

13. An electronic device as claimed in claim 1, wherein said at least one processor is configured to determine said likelihood that said original second light command will not arrive at said destination of said original second light command based on feedback from one or more light devices, knowledge possessed by a network scheduler and/or statistics received from a MAC layer through which said original second light command will be transmitted.

14. A method of transmitting a light command for causing one or more lighting devices to render a light effect, comprising:

determining a first part of said light effect to be rendered by said one or more lighting devices during a first period based on an original first light command;

determining a likelihood that an original second light command specifying a second part of said light effect to be rendered by said one or more lighting devices during a second period, succeeding said first period, will not arrive at a destination of said original second light command is above a threshold;

determining said second part of said light effect, and determining and transmitting an alternative first light command, instead of the original first light command, in dependence on said determined likelihood and based on said determined second part of said light effect, said alternative first light command being determined based on said determined first part of said light effect and said determined second part of said light effect and said alternative first light command specifying a portion of said light effect for both said first period and said second period.

15. A computer program or suite of computer programs comprising at least one software code portion or a computer program product storing at least one software code portion, the software code portion, when run on a computer system, being configured for carrying out the method of claim 14.

* * * * *